United States Patent [19]
Seki et al.

[11] Patent Number: 5,388,051
[45] Date of Patent: Feb. 7, 1995

[54] DIRECT NUMERICAL CONTROL (DNC) SYSTEM INCLUDING ONE HIGH-SPEED DATA PROCESSING UNIT FOR EACH NC MACHINE TOOL

[75] Inventors: Masaki Seki, Tokyo; Takashi Takegahara, Hachioji; Akira Kajitani, Yamanashi, all of Japan

[73] Assignee: Fanuc Ltd., Yamanashi, Japan

[21] Appl. No.: 90,171

[22] PCT Filed: Nov. 9, 1992

[86] PCT No.: PCT/JP92/01451
§ 371 Date: Jul. 22, 1992
§ 102(e) Date: Jul. 22, 1993

[87] PCT Pub. No.: WO93/10944
PCT Pub. Date: Jun. 10, 1993

[30] Foreign Application Priority Data
Nov. 25, 1991 [JP] Japan ............... 3-335734

[51] Int. Cl.⁶ .................... G05F 15/46; G05B 19/417
[52] U.S. Cl. ........................... 364/474.11; 364/132
[58] Field of Search .................. 364/474.11, 474.02, 364/131-136, 138, 139

[56] References Cited

U.S. PATENT DOCUMENTS

| | | | |
|---|---|---|---|
| 4,472,783 | 9/1984 | Johnstone et al. | 364/474.11 X |
| 4,514,814 | 4/1985 | Evans | 364/474.11 |
| 4,580,207 | 4/1986 | Arai et al. | 364/474.11 |
| 4,698,766 | 10/1987 | Entwistle et al. | 369/474.11 X |
| 4,901,218 | 2/1990 | Cornell | 364/474.11 X |
| 4,998,206 | 3/1991 | Jones et al. | 364/474.11 X |
| 5,291,416 | 3/1994 | Hutchins | 364/474.11 X |

FOREIGN PATENT DOCUMENTS

| | | |
|---|---|---|
| 55-96257 | 7/1980 | Japan . |
| 59-45503 | 3/1984 | Japan . |
| 61-234145 | 10/1986 | Japan . |
| 63-500855 | 3/1988 | Japan . |
| 1-252039 | 10/1989 | Japan . |
| 1-252346 | 10/1989 | Japan . |
| 3-164956 | 7/1991 | Japan . |
| 4-70907 | 3/1992 | Japan . |

*Primary Examiner*—Joseph Ruggiero
*Attorney, Agent, or Firm*—Staas & Halsey

[57] ABSTRACT

High-speed data processing units are interposed on one-to-one basis between a host computer and each of NC units corresponding to each of NC machine tools. Each of the high-speed data processing units converts data transmitted from the host computer to each of the NC machine tools into NC data, and then inputs the data to each of the NC units, thereby making unnecessary for the NC units and the host computer to convert the data into NC data. Further, each of the high-speed data processing units temporarily stores machining data or the like transmitted from the host computer, thereby enabling each of machine tool bodies to continue its machining operation without being disturbed by the timing of data transmission.

7 Claims, 3 Drawing Sheets

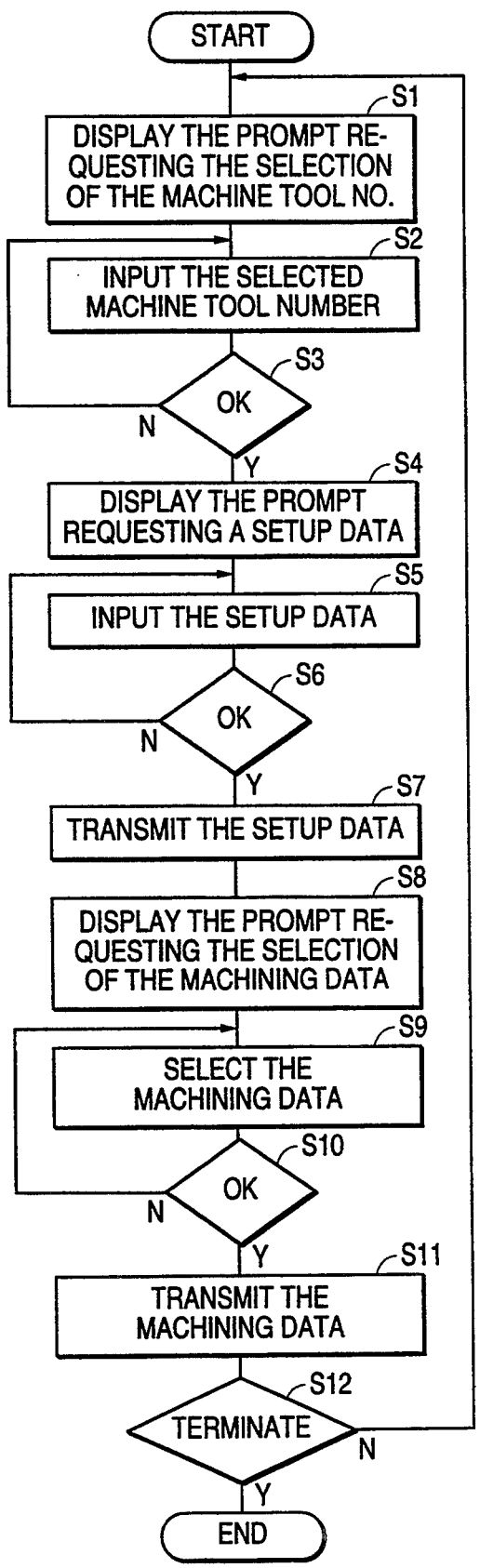

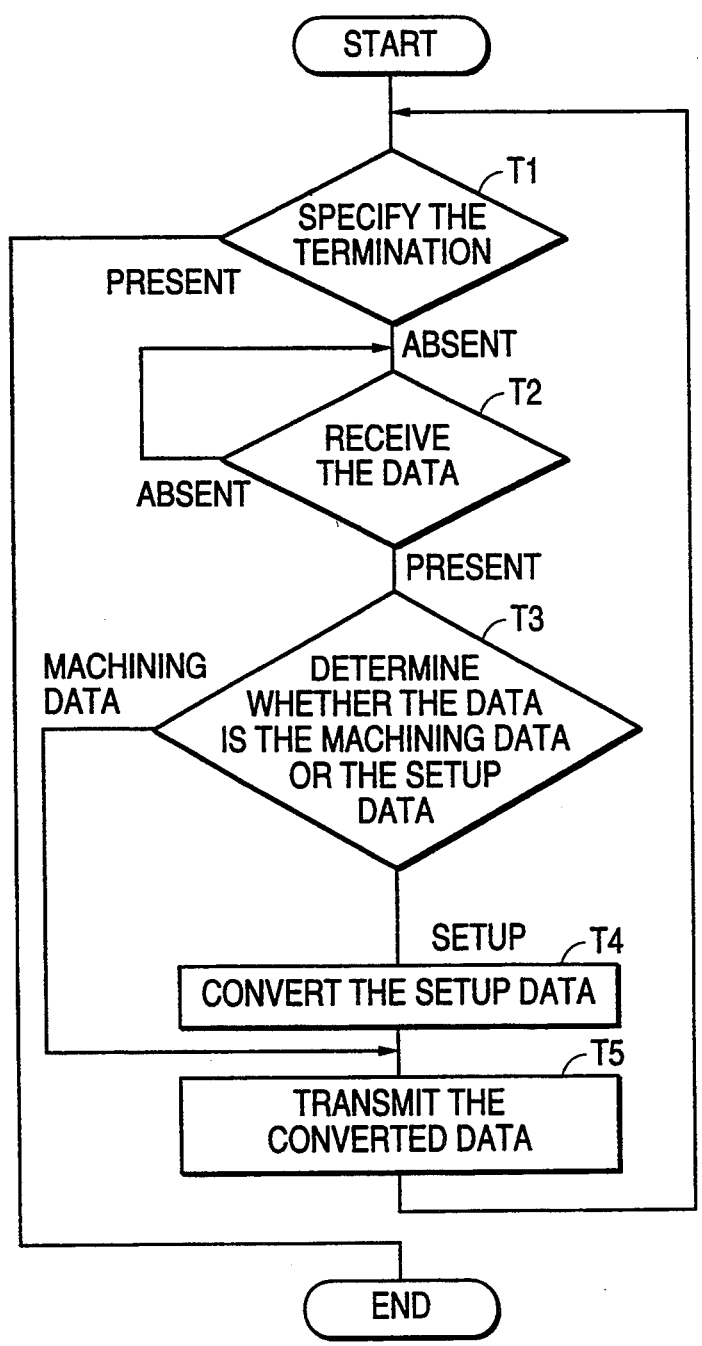

DIRECT NUMERICAL CONTROL (DNC) SYSTEM INCLUDING ONE HIGH-SPEED DATA PROCESSING UNIT FOR EACH NC MACHINE TOOL

BACKGROUND OF THE INVENTION

1. Field of the Invention

The present invention relates to a DNC (Direct Numerical Control) system, and in particular, to improvement of a DNC system for die machining.

2. Description of the Related Art

There is a known DNC system having the structure in which a plurality of NC machine tools are connected to one host computer, and NC data is directly transmitted from the host computer to the NC machine tools. Such a system is often applied in performing a complicated diesinking operation requiring mass NC data, or other operations.

However, in the conventional DNC system, a LAN (Local Area Network) system has been directly connected between the host computer and the NC machine tools. For this reason, it is necessary for the host computer to execute all the processings such as converting different-format data (setup or housekeeping data) required for changing a setup into NC data, transmitting the converted setup data and NC data for machining, or the like. Particularly, during the complicated diesinking operation, excessive load is put on the host computer, as a consequence, there tends to be an interference in the data transmission to the NC machine tools. Further, If the NC machine tools perform part of the process to be executed by the host computer, for example, a process for converting different format data for changing the setup into NC data, load on the side of the NC machine tool increases, which causes the processing speed to drop. For this reason, sometimes there is the need of restricting the data transmission from the host computer to the NC machine tools.

SUMMARY OF THE INVENTION

An object of the present invention is to provide a DNC system which is capable of solving the problems raised in the prior art described above, and of efficiently operating each unit at a high speed without causing excessive load on NC machine tools and the host computer.

To achieve the above object the present invention provides a DNC system which controls a plurality of NC machine tools connected to one host computer, including a high-speed data processing unit for each of the plurality of the NC machine tools so that command information transmitted from the host computer can be distributed to each of the NC machine tools through each of the high-speed data processing units.

Preferably, each of the high-speed data processing units converts the data which is not of NC data format out of the command information transmitted from the host computer into NC data, and inputs the converted data to the corresponding NC unit of the NC machine tools.

Preferably, one of the NC machine tools is specified for and transmitting the data required for changing the setup for machining to the high-speed data processing unit corresponding to the specified NC machine tool by using data input means connected to the host computer, and the NC data for machining read out of memory of the host computer is transmitted by the data input means. On the other hand, the high-speed processing unit determines whether the data transmitted from the host computer is data required for changing a setup or machining data. If the data is one required for changing a setup, the processing unit converts the data into NC data for a numerical control, and transmits the converted NC data to the NC unit of NC machine tool corresponding to the high-speed data processing unit. If the transmitted data is machining data composed of NC data, the processing unit transmits it to the NC unit as it is.

Preferably, one of the NC machine tools is specified, and only machining data for one process and data for the next process required for changing a setup in operation schedule of the specified NC machine tool are set, thereby transmitting these data to the high-speed data processing unit corresponding to the specified NC machine tool and storing them therein. On the other hand, when the high-speed data processing unit receives the machining data for one process and data required for changing the setup for next process, the processing unit converts the data required for changing the setup into NC data, and, if necessary, temporarily stores the converted data and the machining data in its memory, and transmits these data to the NC unit of NC machine tool corresponding to the high-speed data processing unit.

Preferably, while the machining is being executed according to the machining data for one process transmitted to the NC machine tool, or the setup operation for next process is being executed, the host computer sets machining data for the next one process and data required for changing a setup for initiating the next one process, and then transmits these data to the high-speed data processing unit.

Further preferably, one of the NC machine tools is specified, and the machining data for all processes of operation schedule of the specified NC machine tool out of the whole schedule to be covered by the specified NC machine tool out of the whole schedule are set, thus transmitting and storing these data to and in memory of the high-speed data processing unit corresponding to the specified NC machine tool. On the other hand, when one of the high-speed data processing units receives the machining data for the entire process and data required for changing a setup, the processing unit converts the data required for changing the setup into NC data, and stores these data in its memory, thereby sequentially transmitting the stored data to memory of the NC unit corresponding to the specified NC machine tool for each predetermined cycle.

More preferably, the NC machine tool is used for die machining.

As described above, in the present invention, the host computer transmits data for changing setup and NC data for machining for each of the NC machine tools to each of the high-speed data processing units corresponding to each of the NC machine tools. On the other hand, the high-speed data processing unit converts the data transmitted from the host computer into NC data, and inputs the data to each of the NC machine tools. Further, while the machining by the NC machine tools or the operation for changing the setup is being executed, the data transmitted from the host computer is temporarily stored in the high-speed data processing units. When the NC machine tool has been prepared for receiving the transmitted data, the high-speed data processing unit inputs the transmitted data, which has been converted into NC data, to each of the NC machine tools.

BRIEF DESCRIPTION OF THE DRAWINGS

FIG. 2 is a flowchart schematically showing data transfer processing by the host computer applied in the DNC system for die machining of the same embodiment; and FIG. 3 is a flowchart schematically showing transmitted data conversion processing by a high-speed data processing unit included in the DNC system for die machining of the same embodiment.

DETAILED DESCRIPTION OF THE PREFERRED EMBODIMENTS

Figure 1:
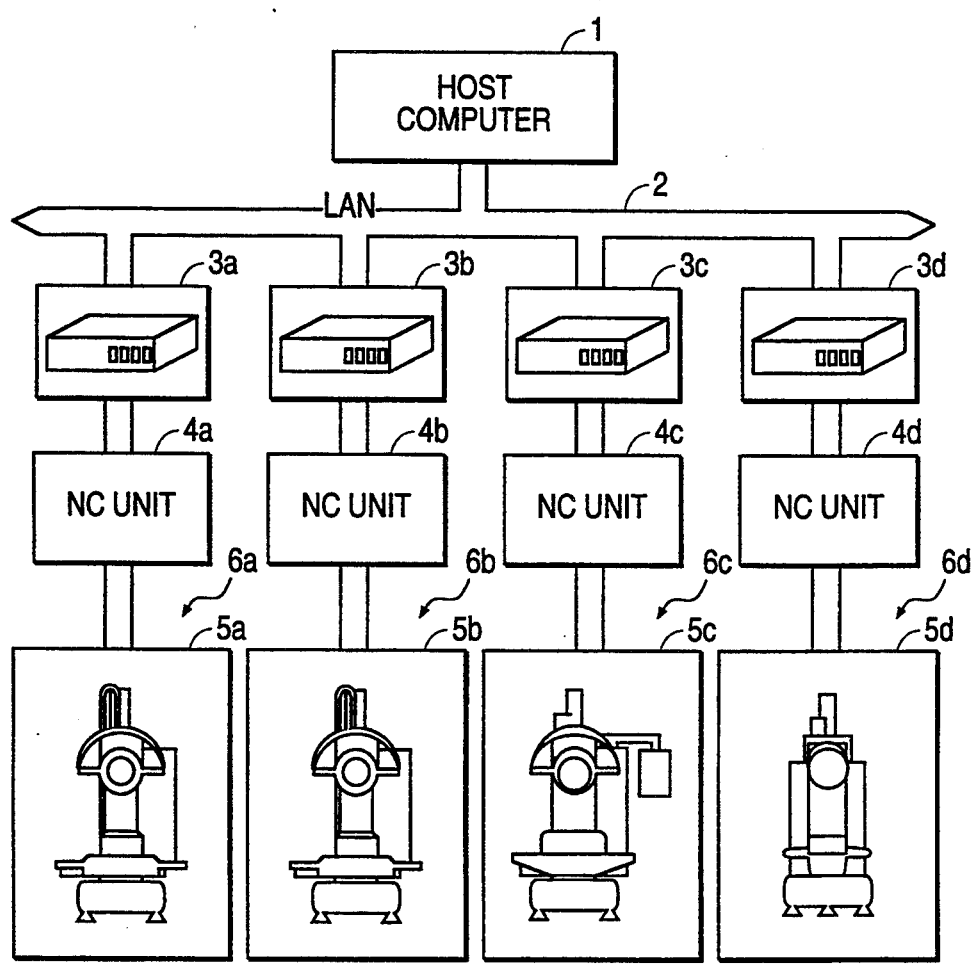
FIG. 1 is a block diagram schematically showing a DNC system for die machining according to one embodiment of the present invention.

Embodiments of the present invention will be explained below with reference to the drawings. FIG. 1 is a block diagram schematically showing a Direct Numerical Control (hereinafter referred to as DNC) system for die machining according to one embodiment of the present invention. Each of reference numerals 6a to 6d denotes an NC machine tool such as an NC milling cutter, NC grinder, or the like. Further, these NC machine tools 6a to 6d are equipped with machine tool bodies 5a to 5d, and NC units 4a to 4d for controlling a drive of each of machine tool bodies, respectively.

The host computer 1 generally controlling these NC machine tools 6a to 6d includes a microprocessor which functions as an arithmetic unit, memories such as ROM/RAM which store programs, set data, a manual control panel for inputting data, and a CRT display as a displaying means. These memories previously store various machining data comprising machine tool numbers for designating NC machine tools 6a to 6d and NC data for executing different machining operations, and setup data including tool numbers required for instructing the change of setup or the like.

Each of high-speed data processing units 3a to 3d, correspondingly located in the respective NC machine tools 6a to 6d, is connected to an NC coupling unit which constitutes an interface of the host computer 1 through a Local Area Network (hereinafter referred to as LAN) 2 as data transmission paths. The NC units 4a to 4d of the NC machine tools 6a to 6d are connected to the high-speed data processing units 3a to 3d, respectively. The respective high-speed data processing units 3a to 3d include a microprocessor, as an arithmetic unit, and memories such as ROM for storing control programs, RAM for temporarily storing data, or the like. The NC units 4a to 4d also include a microprocessor as an arithmetic unit, ROM for storing control programs, RAM as memory for storing NC data, or the like. Rotation of a spindle, a feed of an axis, and the like of the respective machine tool bodies 5a to 5d are controlled in accordance with NC data stored in the NC data memory.

Referring to flowcharts shown in FIGS. 2 and 3, processing operations of the host computer and the high-speed processing units 3a to 3d in the DNC system according to the present embodiment will be described below. FIG. 2 is a flowchart schematically showing "data transfer processing" for specifying machine tool numbers of the NC machine tools 6a to 6d, and inputting them in the host computer 1, thus transmitting setup data and machining data for each machine tool. This operation can be activated by operating the manual operation panel of the host computer 1, and selecting the item of "data transfer processing".

The host computer 1, which initiated the "data transfer processing", first calls all of the previously registered machine tool numbers corresponding to each of NC machine tools 6a to 6d, out of memory included in the host computer 1, and displays them on a screen of the CRT display. After the prompt requesting the selection of machine tool numbers is displayed (step S1), the computer waits until the operator selects a desired machine tool number by using the operator control panel (steps S2 and S3). Subsequently, when the selection of the desired machine tool number by the operator is detected, the host computer 1 temporarily stores the machine tool number selected by the operator, and displays the prompt requesting an input of the setup data from the operator on the CRT display (step S4). Further, the computer waits for an input of tool numbers or the like required for changing a setup to execute a machining operation (steps S5 and S6). When the input of the setup data is completed, the computer 1 refers to the machine tool number selected in step S2, and specifies the NC machine tool corresponding to the selected machine tool number, for example, the high-speed data processing unit 3a included in the NC machine tool 6a, thus transmitting not only the tool numbers but also the other necessary setup data inputted at the present process (step S7). The setup data does not directly indicate cutting profile, tool path, or the like for the machining, but show, for example, the tool number corresponding to a tool to be mounted for the next machining, or the like. Thus, the setup data is different from NC data in format.

The host computer 1, which transmitted the setup data, further displays a list of various machining data stored in memory of the host computer 1 on the CRT display, and informs the operator of the machining data capable of being selected (step S8), and waits until the machining data is selected by the operator through the operator control panel (steps S9 and S10). When the selection by the operator is detected, the host computer 1 reads the selected machining NC data out of memory included in the computer 1, and specifies the NC machine tool corresponding to the machine tool number selected in step S2, for example, the high-speed data processing unit 3a included in the NC machine tool 6a so as to transmit the machining NC data (step S11), thus resetting the machine tool number temporarily stored in response to the processing of step S2.

When the host computer 1 transmits the setup data and machining data to the high-speed data processing unit corresponding to the machine tool number selected in the present process, the computer 1 waits until a set ending or continuing key of the operator control panel is operated (step S12). If the set continuing key is operated, the sequence again returns to step S1, and the same procedures as described above are repeatedly executed, thereby transmitting a new setup data and machining data to the high-speed data processing unit included in the NC machine tool corresponding to a machine tool number newly selected by the operator. On the other hand, if the set ending key is operated, the "data transfer processing" ends temporarily.

After completing the "data transfer processing" temporarily, when the operator again selects the item of "data transfer processing" through the operator control panel of the host computer 1, the host computer repeatedly executes the aforesaid operation, thereby transmitting new setup data and machining data to each of the high-speed processing units 3a to 3d.

Meanwhile, each of the high-speed data processing units 3a to 3d repeatedly executes "transmitted data conversion processing" as shown in FIG. 3 for each specified cycle, and waits for the data transmission from the host computer 1.

When the high-speed data processing units 3a to 3d initiate the "transmitted data conversion process" for each specified cycle, each of these units first determines whether or not a termination specifying flag is set in memory of the high-speed data processing unit, or whether or not all of processing concerning the scheduled operation of NC machine tool including the high-speed processing unit are completed (step T1). If the termination specifying flag is not set, each of the processing units waits until the setup data or machining data is transmitted from the host computer 1 (step T2). Sequentially, when the high-speed data processing units 3a to 3d detect the reception of transmitted data, each of these units determines whether the transmitted data is the setup data or the machining data (step T3). If the transmitted data is the setup data, each of the processing units converts the setup data such as tool number required for changing the setup for machining into NC data fop numerical control (step T4), and transmits the converted setup data to the NC unit which is connected to the high-speed data processing unit (step T5). On the other hand, if the transmitted data is the machining data composed of NC data, each of the processing units additionally transmits the machining data to the NC data memory of the NC unit as it is (step T5). Further, if the transmitted data from the host computer 1, which is detected in the present step, is the machining data, each of the processing units determines whether or not a scheduled operation terminating command is set to the last of the transmitted machining data group. If the scheduled operation terminating command is set, the termination specifying flag is set in memory of the high-speed data processing unit. Accordingly, the decision made in step T1 becomes false in a state in which the termination specifying flag is set, and the "transmitted data conversion processing" is substantially non-executable.

According to the present embodiment, the setup data transmitted from the host computer 1 is converted into NC data by means of the high-speed data processing units 3a to 3d, and is thereafter inputted to each of the NC units 4a to 4d, so that neither the host computer 1 nor the NC units 4a to 4d need to execute the operation for converting the setup data, thereby reducing loads on both the host computer 1 and NC units 4a to 4d.

The DNC system for die machining according to the present embodiment is further capable of executing processing operations as described below.

In the case where the setup data concerning the whole schedule of each of the NC machine tools 6a to 6d and the machining data cannot be stored simultaneously in memory due to lack of capacity of the high-speed data processing units 3a to 3d, each of the NC machine tools 6a to 6d is first individually selected pursuant to the aforesaid "data transfer processing" (steps S1 to S3). The machining data for only one process and setup data for the next process in each schedule are set to the host computer 1, and are then transmitted to the high-speed data processing units 3a to 3d, thereby storing these data in memory (steps S4 to S11). Thereafter, such an operation is repeatedly executed (step S12), and the machining data for one process and setup data for the next process of the respective NC machine tools 6a to 6d are stored in memory of each of the high-speed data processing units 3a to 3d. In this case, in order to transmit the machining data for the first process in each schedule, the setup data for initiating the first process and for initiating the second or next process are transmitted simultaneously. On the other hand, each of the high-speed data processing units 3a to 3d detects the reception of the machining data for one process and the setup data for the next process in the "transmitted data conversion process" (steps T1 to T3), and then converts the transmitted setup data into NC data (step T4), thus transmitting the converted setup data and the machining data to memory of each of the NC units 4a to 4d (step T5). The rotation of spindle and a feed of each axis of the machine tool bodies 5a to 5d are controlled by the NC units 4a to 4d, thereby performing a desired machining. When the capacity of each memory for storing NC data of the NC units is not large enough, the high-speed data processing units 3a to 3d temporarily store the setup data, which is transmitted from the host computer and converted, and the machining data in each memory of these processing units (a process in place of step T5). Thereafter, these processing units detect availability of a free space in memory of each of the NC units 4a to 4d in every other specified cycle, which is time-shared, and the machining data equivalent to the free space may be sequentially transmitted, from each memory of the high-speed data processing units 3a to 3d, to each memory of the NC units 4a to 4d.

In such a case, only machining data for one process and setup data for the next process out of the whole schedule of the NC machine tools 6a to 6d are stored in each memory of the high-speed data processing units 3a to 3d. However, in a step in which the machining for one process by the NC machine tools 6a to 6d has progressed to some extent, or in which the machining for one process has been completed to initiate the setup operation for the next process, there is sufficiently large free space in each memory of the high-speed data processing units 3a to 3d. This allows the followings: during execution of the machining for one process, or of the setup operation for the next process, when the "data transfer processing" by the host computer 1 is again executed, the next machining data for one process and setup data for initiating the following process are set and transmitted to the high-speed data processing units 3a to 3d. Accordingly, it is not necessary to interrupt an operation of each of the NC machine tool 6a to 6d in order to executed the data transmission from the host computer 1, thereby effectively operating each of the NC machine tools.

If each memory of the high-speed data processing units 3a to 3d has sufficient capacity, the setup data concerning the whole schedule of each of the NC machine tools 6a to 6d and the machining data can be stored simultaneously in each memory of the high-speed data processing units 3a to 3d. In this case, each of the NC machine tools 6a to 6d is first individually selected pursuant to the aforesaid "data transfer processing" (steps S1 to S3). The machining data for all processes and setup data for all processes in each schedule, are set to the host computer 1, and are then transmitted to the high-speed data processing units 3a to 3d thus these data being stored in memory (steps S4 to S11). Thereafter, such an operation is repeatedly executed (step S12), and the machining data for the entire process and setup data for all processes of the respective NC machine tools 6a to 6d are stored in memory of each of the high-speed data processing units 3a to 3d. On the other hand, each of the high-speed data processing units 3a to 3d detects the reception of the machining data for the entire process and the setup data for the entire process in the "transmitted data conversion processing" (steps T1 to T3), and then converts the transmitted setup data into NC data (step T4), thereby causing the converted setup data for the entire process and the machining data for the entire process to be stored in each memory of the high-speed data processing units 3a to 3d (a process in place of step T5). Thereafter, these processing units detect the presence of a free space in memory of each of the NC units 4a to 4d in every other specified cycle which is time-shared, and the machining data equivalent to the free space may sequentially be transmitted from each memory of the high-speed data processing units 3a to 3d to each memory of the NC units 4a to 4d. The rotation of spindle and a feed of each axis of the machine tool bodies 5a to 5d are controlled by the NC units 4a to 4d, thus sequentially performing the machining of the entire schedule in an on-line mode.

In this case, since the host computer 1 is merely utilized as set data selecting means and input means, in order to execute the data transmission from the host computer 1, it is not necessary to interrupt an operation of each of the NC machine tools 6a to 6d, so that each of the NC machine tools can effectively be operated likewise.

As described above, the present invention provides a DNC system for die machining, which includes a high-speed data processing unit for each of NC machine tools installed between each of NC machine tools and the host computer. The high-speed data processing unit converts the data transmitted from the host computer into NC machine tools, so that the host computer and NC machine tools need not convert the data to the NC data, and load on the host computer and NC machine tool can be reduced. Further, even when machining data or the like from the host computer is transmitted to the high-speed data processing units while NC machine tools are in operation, the high-speed data processing unit can temporarily store the machining data or the like, and continue the machining operation of NC machine tools, so that a plurality of NC machine tools can smoothly and effectively be operated without being disturbed by the timing of data transmission between the host computer and NC machine tools.

We claim:

1. A DNC system for controlling a plurality of NC machine tools connected to one host computer, comprising:

a plurality of high-speed data processing units provided for each of said plurality of NC machine tools, respectively, each to distribute command information transmitted from said one host computer to each of said respective NC machine tools; and data input means, connected to said host computer, for inputting a specified one of said plurality of NC machine tools and for inputting set-up data for said specified NC machine tool, said host computer then transmitting said set-up data, indicating a change of set-up for machining, to one of the high-speed data processing units corresponding to the specified NC machine tool and transmitting NC machining data, corresponding to said specified NC machine tool and read from a memory of said host computer, to said corresponding high-speed data processing unit, said corresponding high-speed data processing unit further determining said transmitted data to be said set-up data and said NC machining data, respectively, converting said determined set-up data into NC set-up data for numerical control and transmitting said converted NC set-up data to an NC unit for the specified NC machine tool, and transmitting said determined NC machining data to the NC unit for the specified NC machine tool as is.

2. A DNC system according to claim 1, wherein said plurality of high-speed data processing units convert data not being of NC data format of the command information transmitted from said host computer into NC data, and input the converted data to each of a plurality of NC units respectively connected to said respective plurality of NC machine tools.

3. A DNC system according to claim 1, wherein said NC machine tools are used for die machining.

4. A DNC system for controlling a plurality of NC machine tools connected to one host computer, comprising:

a plurality of high-speed data processing units provided for each of said plurality of NC machine tools, respectively, each to distribute command information transmitted from said one host computer to each of said respective NC machine tools; and data input means, connected to said one host computer, for inputting a specified one of said plurality of NC machine tools and for inputting set-up data for said specified NC machine tool, said host computer then setting and transmitting only NC machining data, read from a memory of said host computer and corresponding to said specified NC machine tool, for one process and said set-up data, for changing a set-up for machining, for a next process in an operation schedule of the specified NC machine tool to a high-speed data processing unit corresponding to the specified NC machine tool, said corresponding high-speed data processing unit further receiving and storing the transmitted NC machining data for said one process and the transmitted set-up data for the next process, and converting the transmitted set-up data into NC set-up data and transmitting the converted NC set-up data to an NC unit of the specified NC machine tool and transmitting the NC machining data to the NC unit of the specified NC machine tool.

5. A DNC system according to claim 4, wherein said corresponding high-speed data processing unit further temporarily stores the converted NC set-up data and the NC machining data in a memory of said high-speed data processing unit, and then transmits the stored converted NC set-up data and NC machining data to the NC unit of the specified NC machine tool, in every predetermined cycle.

6. A DNC system according to claim 5, wherein while machining is being executed in accordance with the NC machining data for the one process transmitted to the specified NC machine tool or a setup operation for the next process is being executed based on the NC set-up data, the host computer sets machining data for a subsequent next one process and data required for changing a setup for initiating the subsequent next one process, and then transmits these data to the high-speed data processing unit.

7. A DNC system for controlling a plurality of NC machine tools connected to one host computer, comprising:

a plurality of high-speed data processing units provided for each of said plurality of NC machine tools, respectively, each to distribute command information transmitted from said one host computer to each of said respective NC machine tools; and data input means, connected to said host computer, for inputting a specified one of said plurality of NC machine tools and for inputting set-up data for said specified NC machine tool, said host computer then setting and transmitting NC machining data, read from a memory of said host computer and corresponding to said specified NC machine tool, for all processes of an operation schedule to be covered by the specified NC machine tool and transmitting the set-up data, for changing a set-up for machining, of said all process of said operation schedule, to a high-speed data processing unit corresponding to the specified NC machine tool which stores the transmitted data in a memory, and when said corresponding high-speed data processing unit receives the NC machining data and the set-up data for said all processes of said operation schedule, said corresponding high-speed data processing unit converts the set-up data into NC set-up data and stores the converted NC set-up data in said memory, thereby sequentially transmitting the stored NC set-up data and NC machining data to a memory of an NC unit for the specified NC machine tool, in every predetermined cycle.

* * * * *